United States Patent [19]
Fletcher

[11] Patent Number: 5,489,740
[45] Date of Patent: Feb. 6, 1996

[54] SUBTERRANEAN DISPOSAL OF WASTES

[75] Inventor: Paul A. Fletcher, Richardson, Tex.

[73] Assignee: Atlantic Richfield Company, Los Angeles, Calif.

[21] Appl. No.: 234,531

[22] Filed: Apr. 28, 1994

[51] Int. Cl.⁶ .............................. A62D 3/00; B09B 3/00
[52] U.S. Cl. ........................................ 588/250; 405/128
[58] Field of Search ................................. 405/128, 129; 588/250; 175/66, 206; 166/305.1, 305 D, 308

[56] References Cited

U.S. PATENT DOCUMENTS

| | | | |
|---|---|---|---|
| 3,292,693 | 6/1962 | Hill et al. | 166/2 |
| 5,129,469 | 7/1992 | Jackson | 175/66 |
| 5,226,749 | 7/1993 | Perkins | 405/128 |
| 5,314,265 | 5/1994 | Perkins et al. | 405/128 |
| 5,387,737 | 2/1995 | Schmidt et al. | 166/305.1 X |

FOREIGN PATENT DOCUMENTS 233971  6/1961  Australia .

*Primary Examiner*—Dennis L. Taylor
*Attorney, Agent, or Firm*—Michael E. Martin

[57] ABSTRACT

Toxic wastes including naturally occurring radioactive materials are disposed of into subterranean earth formation zones which are bounded both above and below by zones which have higher in situ compressive stresses. The materials are prepared in a slurry of finely ground solids and a carrier liquid and are injected into a fracture created in the disposal zone by a process which includes initiating and extending the fracture with a fracturing fluid having a filter cake building solids material entrained therein to build a sealant layer on the fracture faces, The fracture fluid is followed by injection of the waste material which is followed by injection of more fracture fluid and/or a clear liquid such as fresh water or seawater to remove all toxic material from the injection well and the vicinity thereof. The fracture is then allowed to close to confine the waste material therein.

10 Claims, 3 Drawing Sheets

SUBTERRANEAN DISPOSAL OF WASTES

BACKGROUND OF THE INVENTION

1. Field of the Invention

The present invention pertains to a method for disposing of slurried and sometimes toxic solids wastes in hydraulically fractured subterranean earth formations and in such a way that the waste material is confined in the fracture.

2. Background

Certain types of solid waste material may be permanently stored or disposed of by forming a slurry of solids particulates of the waste with a carrier liquid, reducing the particle size of the solids and then injecting the slurry into a subterranean earth formation. U.S. Pat. No. 5,129,469 to J. E. Jackson, issued Jul. 14, 1992, assigned to the assignee of the present invention, and incorporated herein by reference describes a system for disposing of drill cuttings from drilling wells in earth formations by combining the cuttings with a carrier liquid, grinding the cuttings to a predetermined particle size and injecting the viscous slurry of cuttings and carrier liquid which results from the grinding operation into a subterranean earth formation zone.

Certain problems arise, however, with respect to the disposal of certain types of wastes wherein the containment of the waste material in a particular portion of an earth formation zone is required. In the production of oil and gas, for example, a significant amount of naturally occurring radioactive material (NORM) may accumulate in the conduits and processing vessels associated with the production wells and related fluid handling facilities. The radioactive parts of these naturally occurring radioactive materials are usually Radium$^{226}$ and/or Radium$^{228}$. These radioactive substances are usually bound within the structure of scales and other produced solids. Typically, the composition of the scale is in the form of barium sulfate which is particularly hard and cannot be dissolved by most naturally occurring fluids. Accordingly, this barium sulfate scale, as well as other materials which are mixed with the scale, presents a disposal problem because of its radioactivity.

Certain techniques for disposing of solids-laden slurries in subterranean formations are described in U.S. patent application Ser. No. 08/032,951 filed Mar. 17, 1993, by Thomas K. Perkins, et. al now U.S. Pat. No. 5,314,265, issued May 24, 1995, and assigned to the assignee of the present invention. This application describes a method of disposing of slurries of relatively fine particles of solid wastes into disposal zones which have a lower in situ compressive stress than that of an overburden zone and an underburden zone adjacent to the disposal zone. The disposal zone preferably has a permeability greater than the overburden and underburden zones. This technique is advantageous in that it is common to find earth formations having one or more relatively permeable zones of substantial thickness which are located below a formation zone comprising overburden of relatively impermeable material and which may exhibit in situ compressive stresses generally greater than the more permeable zone.

U.S. patent application Ser. No. 08/043,323 filed Apr. 6, 1993, by Joseph H. Schmidt, et. al now U.S. Pat. No. 5,387,737, issued Feb. 7, 1995, and assigned to the assignee of the present invention describes a method of disposing of particulate solids in a subterranean formation by injecting a quantity of substantially solids-free liquid into a predetermined disposal zone having a predetermined porosity such that the injection of the solids-free liquid disaggregates at least part of the disposal zone, and then injecting a slurry of particulate solids into the disaggregated part of the disposal zone to place the solids in the pore spaces of the disaggregated part of the disposal zone. Other techniques which are of interest but which are not suitable for disposing of toxic wastes in accordance with the present invention are disclosed in U.S. Pat. No. 3,292,693 issued Dec. 20, 1966 to G. A. Hill, et. al, which describes a technique of disposing of liquid wastes into a low pressure zone in an earth formation which is between higher pressure zones and wherein liquids in the higher pressure zones tend to migrate toward the low pressure zone.

Still further, Australian Patent 233,971, published Mar. 3, 1960 by J. J. Reynolds, et al, describes a method of underground disposal of radioactive liquids or slurries wherein a substantially horizontal fracture is created in a shale or nominally non-porous rock formation by opening the fracture with a suitable fracturing fluid and then injecting a radioactive waste material and propagating the fracture by injecting the radioactive fluid at a pressure greater than the formation breakdown pressure. Although generally horizontal fractures were thought to be the type of fracture typically formed in a subterranean earth formation according to the state of the art in 1960, it is generally accepted presently that fractures tend to extend in generally vertical planes under the urging of hydraulic or similar fluid injections. Moreover, totally non-porous or non-permeable formations may exist but they are difficult to locate and are usually not readily accessible for disposal operations.

Notwithstanding the foregoing methods for disposing of slurries of waste materials, the present invention provides a method for disposing of toxic wastes, including radioactive materials, in an improved way which substantially satisfies the requirement of containment of the waste in a predetermined earth formation zone.

SUMMARY OF THE INVENTION

The present invention provides an improved method of disposing of slurried solids wastes and the like in a predetermined containment zone in an earth formation in a way which will substantially prevent migration of the waste away from the containment zone.

In accordance with an important aspect of the present invention, a method of disposing of toxic wastes, including, in particular, naturally occurring radioactive materials, is provided wherein an earth formation zone is selected which has an in situ compressive stress over a suitable vertical extent which is less than the in situ compressive stress. of a zone above the disposal zone and a zone immediately below the disposal zone. The disposal zone is selected as one which has no communication with other zones and substantially no potential for contamination by materials in surrounding zones. The disposal zone is preferably relatively shallow so that relatively low injection pressures may be used and the overall cost of the disposal process may be minimized.

In accordance with another important aspect of the present invention, a method of disposing of slurried solids wastes into a subterranean earth formation is provided wherein a substantially fluid tight filter cake may be built up on the fracture faces by an injection fluid which precedes the waste slurry. Moreover, the overall process is carried out in such a way that none of the waste slurry remains in the wellbore or in the fracture formed in the disposal zone immediately adjacent to the wellbore. Still further, the disposal zone is selected as one which does not contain hydrocarbon fluids or any other commercial minerals.

The method of the present invention also contemplates providing the disposal slurry to contain solids which are of minimum particle size and of a concentration which will assist in placing the material in the fracture with a low risk of encountering so-called screening out or bridging off of the fracture.

Those skilled in the art will recognize the above-mentioned advantages and superior features of the invention together with other important aspects thereof upon reading the following description in conjunction with the drawings.

DESCRIPTION OF A PREFERRED EMBODIMENT

Figure 1:
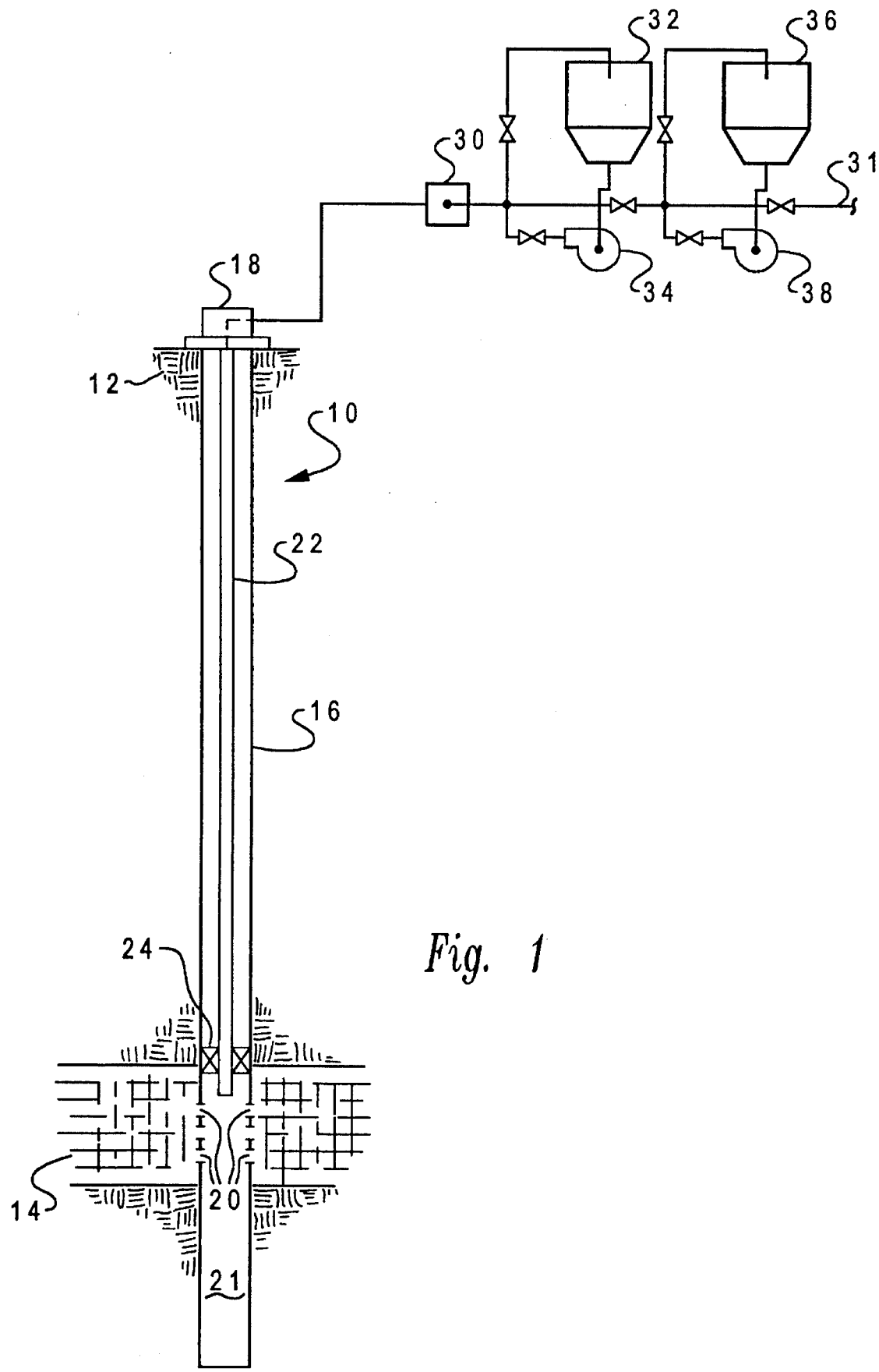
FIG. 1 is a diagram of an injection well suitable for carrying out the waste disposal method of the invention.

In the description which follows, like elements are marked throughout the specification and drawing with the same reference numerals, respectively. The drawing figures are not necessarily to scale.

Referring to FIG. 1, there is illustrated a schematic diagram of a well 10 extending into an earth formation 12 including a particular zone 14 which has been identified as being suitable for Storage of certain types of toxic wastes in accordance with the present invention. The well 10 is shown as being provided with a conventional casing 16 and a wellhead 18 at the surface of the earth formation. The casing 16 is suitably perforated at 20 to place the wellbore space 21 in communication with the formation zone 14. A tubing string 22 extends from the wellhead 18 to a point in the vicinity of the perforations 20 and is suitably in registration with a conventional packer 24 to isolate the wellbore space 21 from the well annulus between a major portion of the tubing string 22 and the casing 16.

Slurries of particulate solids wastes may be injected into the wellbore space 21 to flow through the perforations 20 into the formation zone 14 by way of a suitable high-pressure pump 30 which is operable to receive a solids-laden slurry from a storage vessel 32 by way of a pump 34, for example. A hydraulic fracturing fluid in accordance with the method of the invention may also be communicated to the pump 30 from a storage vessel 36 and by way of a pump 38. Other fluids such as seawater, brine or fresh water may be communicated to the pump 30 from a suitable source, not shown, by way of a conduit 31. The system for providing fracturing fluid and solids-laden slurry to the well 10 may also be of the type described in U.S. Pat. No. 5,129,469. The '469 patent describes a system for preparing a slurry of solids particulates wherein the particles of the solids are reduced to a predetermined size by a suitable shearing and grinding action and a suitable slurry is formed which is then transmitted to the pump 30.

The selection of the zone 14 and the well 10 are based on several factors including that the well must have, of course, good mechanical integrity, the reservoir or formation zone 14 should be depleted of commercial hydrocarbons or other commercial fluids and not be in communication with other reservoirs. There should be reasonable knowledge of the extent of the zone 14 and potential for contamination by surrounding zones and, preferably, the zone is relatively shallow to minimize injection pumping requirements and overall cost. With these preselection factors in mind, once the formation zone 14 has been selected, based on these other factors, a determination of the horizontal stress distribution in the zone 14 should be executed. This may be carried out by analyzing data from sonic logs in conjunction with neutron and bulk density porosity logs, for example, and calculating the minimum horizontal stress as a function of depth.

Figure 2:
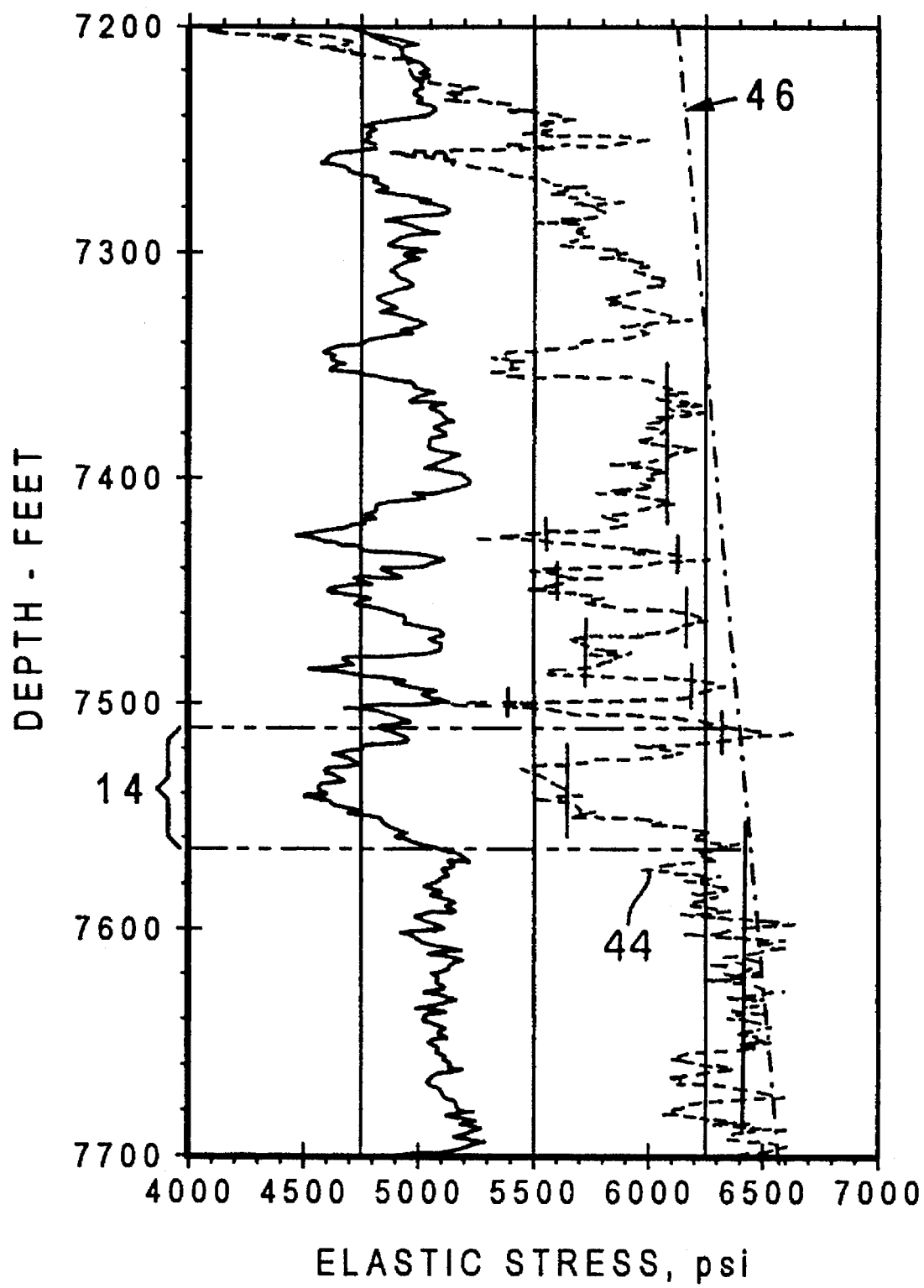
FIG. 2 is a diagram illustrating a typical in situ compressive stress characteristic of an earth formation having a suitable disposal zone in accordance with the method of the invention.

FIG. 2 shows the variation in horizontal stress, as well as vertical stress, as a function of depth in the zone 14 of formation 12. The dashed line 44 in FIG. 2 is the minimum in situ horizontal stress and the dot-dash line 46 is the vertical stress, both as a function of depth. It is noted that in a region of depth of about 7510 feet to 7565 feet that the elastic stresses are reduced with respect to the stresses both above and below such a zone. Accordingly, this is the preferred portion of zone 14 into which the waste material may be injected and confined since a hydraulic fracture will tend to not grow out of the zone, particularly if the fracture pressure is maintained below a predetermined limit. The development of a fracture in a zone such as the zone 14 may be modelled using commercially available pseudo three-dimensional fracture model programs operating on digital processing devices or computers. Moreover, the proposed zone for injection of the waste material may be subjected to a test fracture or fractures to determine its performance characteristics with respect to verification of the minimum horizontal stress and to measure the leak-off characteristics of one or more selected fracturing fluids.

Figure 3:
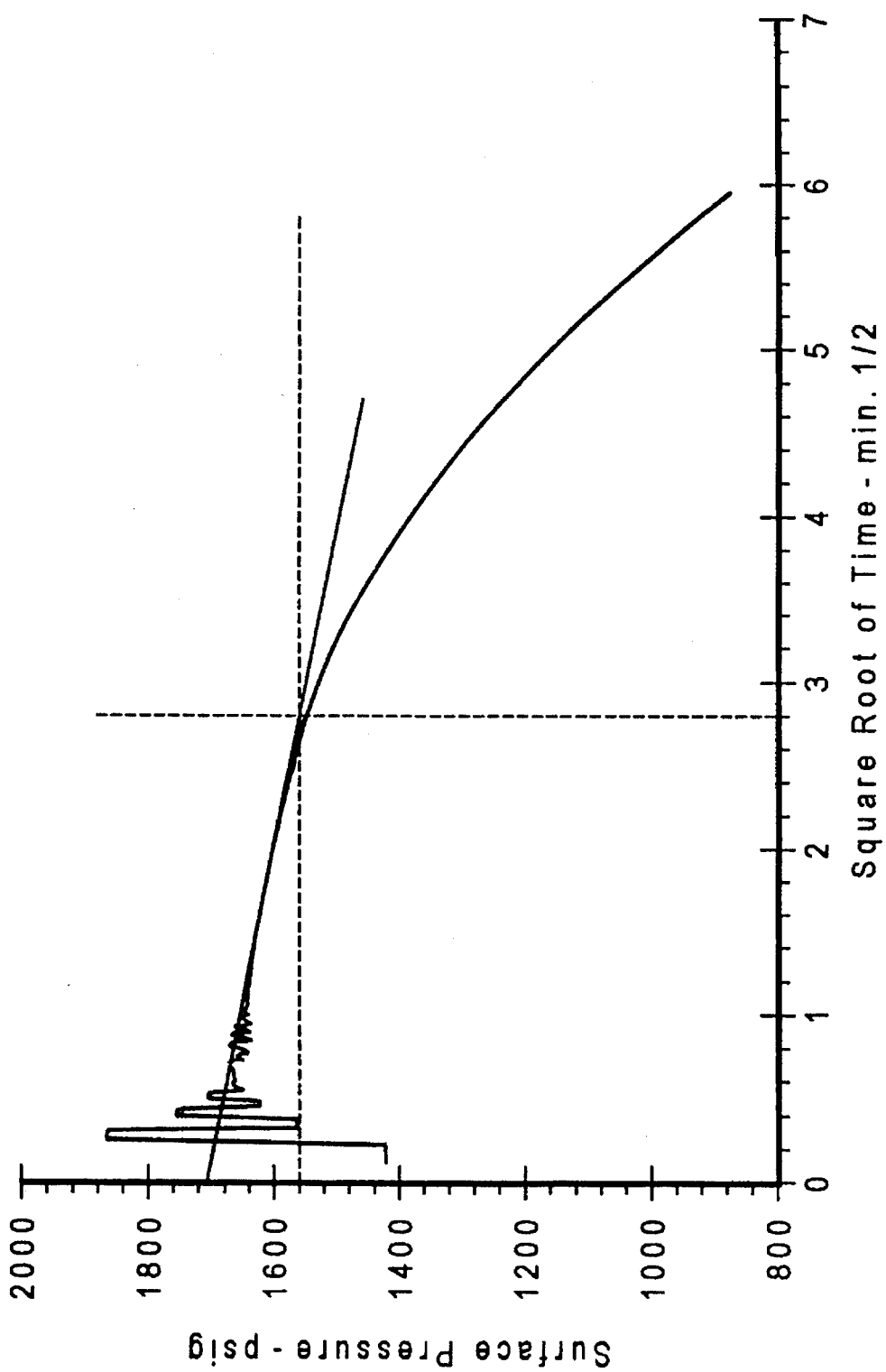
FIG. 3 is a diagram showing an example of determining the fracture closure pressure of a disposal zone selected in accordance with the present invention.

After establishing the well 10 in the configuration shown schematically in FIG. 1, a mini-fracture test may be carried out using, for example, a mixture of fresh water and a weighting and leak-off control agent or sealant such as bentonite. Alternatively, a mixture of seawater and a compatible weighting and leak-off control agent or sealant such as attapulgite may be used. These fluids may be pumped into the well 10 at an increasing injection rate until pressure measurements taken at the surface or in the space 21, using commercially available instruments, not shown, indicate that the fracture has been initiated and is being extended. Moreover, after cessation of pumping the pressure decline, measured at the surface, for example, may be monitored to determine if fracture closure occurs. FIG. 3 shows the results of a typical test fracture operation to determine the fracture closure pressure, which can be considered an important parameter with respect to storing waste materials.

The data indicated for the parameters of FIGS. 2 and 3 are exemplary of a saltwater bearing sand found beneath the Gulf of Mexico, being pleistocene in age, having a porosity in the range of from 32% to 36% and a permeability ranging from 150 md to 1800 md. A mixture of bentonite and fresh water in a concentration of 15 lbs. per barrel (42 U.S. gallons per barrel) was pumped at a rate of sir barrels per minute to obtain data for the diagram of FIG. 3.. After pump shut-off, the pressure decline curve indicates a fracture closure pressure, measured at the surface, of about 1560 psi at eight minutes after pump shut-off. This surface measured pressure corresponds to a bottom hole closure pressure of the fracture in zone 14 in the range of about 4310 psi, which compares favorably with the estimates made of elastic stresses from the data and calculations used to produce the curves of FIG. 2.

In order to minimize migration of waste materials out of the fracture, a fracture fluid efficiency determination is made by estimating the volume of fluid retained in the fracture as a fraction of the total volume pumped during a fracture test. The fluid efficiency is, of course, somewhat dependent on the formation disposal zone permeability. For example, if the permeability is nil, the fluid efficiency should be approximately 100%. The volume of the assumed, vertical two-winged fracture may be determined using conventional methods or that which is described in U.S. patent application Ser. No. 08/216,002, filed Mar. 22, 1994 by Thomas K. Perkins and assigned to the assignee of the present invention.

Accordingly, based on the results of the "minifracture" tests, the waste injection process is preferably preceded by pumping a quantity or "pad" of fluid into the fracture and containing a material which will effectively build a layer of solid material sealant or so-called "filter cake" on the opposed fracture faces as the carrier liquid leaks off or flows into the formation. This buildup of a layer of sealant material will prevent migration of waste solids fines, and possibly some waste liquids, into the formation to any great extent. This will thus maintain essentially all of the waste material in the fracture itself.

In accordance with the present invention, it is contemplated that, if fracture tests indicate a fluid efficiency less than 20% percent, the concentration of the solid leak-off control agent or sealant in the preliminary pad of fluid injected into the disposal zone ahead of the injection of the waste material is increased from a concentration of about 15 to 20 lbs. per barrel of liquid to a range of about 30 lbs. per barrel to 40 lbs. per barrel. The exemplary disposal zone described above was injected with a "pad" of 20 lbs. per barrel of bentonite in fresh water in the amount of 50 barrels prior to injection of a 140 barrel slurry of naturally occurring radioactive material ground to a particle size of 150 to 200 microns. Solids particle size may be increased to about 400 microns, if needed. The necessity of a pad of leak-off control fluid being pumped ahead of the slurry of waste material may be monitored by injecting relatively small batches of pad fluid and slurry of waste material in the amounts indicated above, for example, and, after each injection, monitoring the shut-in pressure of the fracture for fifteen minutes, for example. Pressure rate of reduction after shut-in is indicative of the amount of fluid leak-off occurring and, accordingly, the amount of leak-off control material that is required to be injected ahead of a batch of waste material slurry.

The slurry of waste material itself preferably contains a quantity of material such as bentonite or attapulgite in about the same concentration (in water or seawater) as the fracture initiation and extension fluid described above to serve as a viscosifier to aid in suspending the solids particles of waste material adequately in the slurry and to aid in sealing the fracture faces during the slurry injection if fracture extension, for example, occurs during slurry injection. Fracture fluid viscosity is a factor of expected fracture width and height as determined by fracture model calculations, for example, and the slurry viscosity must be sufficient to (a) maintain the waste material in suspension and suitably dispersed in the slurry, and (b) provide the slurry to serve as a fracture fluid to some extent. In disposing of a sand-barium sulfate mixture of NORM waste about 2.0 lbs. to 2.5 lbs. of waste solids having a particle size of about 150 microns to 200 microns was added to each gallon of fluid also containing 20 lbs. of bentonite per barrel. Viscosity of the slurry and the "pad" fluid is preferably about 70–80 centipoise minimum and may be increased if tests indicate that a higher viscosity is required for fracture size control and suspension of the waste material solids.

Following injection of the waste material in accordance with the invention, each injection cycle preferably includes the injection of a quantity of the bentonite or attapulgite laden sealant or "pad" fluid followed by injection of a quantity of fresh water or seawater. The volumes of sealant or pad fluid and fresh water or seawater, respectively, are determined based on the estimated requirement to displace the waste material sufficiently into the fracture to allow the fracture to close at its intersection with the wellbore and to assure that all waste material has been displaced from the wellbore and the immediate vicinity thereof.

Accordingly, the method of the invention contemplates that a fracture is prepared for receiving waste material by creating the fracture and lining the fracture with a fluid which includes a combination sealant or leak-off control agent and viscosifier, such as bentonite or attapulgite. The composition of the bentonite or attapulgite may be similar to that which is provided for well drilling fluids, for example. These materials are used with fresh water or seawater, respectively. The bentonite and attapulgite are also added to the slurry of water (or seawater) and waste solids in about the same concentration as is used for the fracturing or "pad" fluid.

Although a preferred method for injecting toxic wastes into subterranean earth formations has been described in some detail hereinabove, those skilled in the art will recognize that certain substitutions and modifications may be made to the method without departing from the scope and spirit of the appended claims.

What is claimed is:

1. A method for disposing of waste material in a subterranean earth formation comprising the steps of:

selecting a zone in said earth formation having an in situ horizontal compressive stress which is, over a predetermined height of said zone, less than the in situ horizontal compressive stress of said earth formation above and below said zone, respectively;

placing a wellbore in communication with said zone;

injecting a fracturing fluid into said zone to generate at least one substantially vertical fracture in said zone, at least a predetermined quantity of said fracturing fluid having a particulate solid sealant material therein for forming a filter cake on opposed surfaces of said fracture;

injecting waste material into said fracture after said fracturing fluid to occupy a predetermined volume of said fracture;

injecting a quantity of a fluid consisting of one of water and seawater into said zone after the injection of said waste material to displace said waste material away from said well and within said fracture;

injecting a quantity of fluid containing said sealant material into said fracture after the injection of said waste material and prior to the injection of said one of water and seawater; and allowing said fracture to close to confine said waste material therein.

2. The method set forth in claim 1 including the step of:

testing the closure pressure of said fracture prior to injection of said waste material by injecting a fracturing fluid into said fracture, ceasing the injection of said fracturing fluid and monitoring the decline in pressure in said well as a function of time to determine when said fracture closes in the vicinity of said well.

3. The method set forth in claim 1 wherein:

said fracturing fluid includes one of bentonite and attapulgite as a filter cake building material.

4. The method set forth in claim 1 wherein:

said waste material includes particulate solids and said method includes the step of:

reducing the particle size of said particulate solids to a range of not more than 400 microns particle size and injecting said particulate solids in a slurry into said fracture.

5. The method set forth in claim 1 wherein:

said waste material comprises particulate solids comprising naturally occurring radioactive materials and said waste material is prepared for injection into said zone by grinding said particulate solids to a particle size not to exceed about 400 microns and injecting said naturally occurring radioactive materials into said zone in a slurry of liquid and said particulate solids for confinements in said fracture.

6. The method set forth in claim 4 or 5 wherein:

said slurry includes a quantity of said sealant material therein in a concentration sufficient to suspend solids of said waste material in said slurry.

7. The method set forth in claim 6 wherein:

said slurry includes one of bentonite and attapulgite as said sealant material.

8. A method for disposing of waste material in a subterranean earth formation comprising the steps of:

selecting a zone in said earth formation having a predetermined in situ horizontal compressive stress;

placing a wellbore in communication with said zone;

injecting a fracturing fluid into said zone to generate at least one substantially vertical fracture in said zone, at least a predetermined quantity of said fracturing fluid having a particulate solid sealant material therein comprising one of bentonite and attapulgite for forming a filter cake on opposed surfaces of said fracture;

injecting a slurry of particulate solids of waste material in one of water and seawater and one of bentonite and attapulgite into said fracture after said fracturing fluid to occupy a predetermined volume of said fracture;

injecting a quantity of fluid containing said sealant material into said fracture after the injection of said slurry; and allowing said fracture to close to confine said waste material therein, 9. The method set forth in claim 8 including the step of:

injecting a quantity of a fluid consisting of one of water and seawater into said zone after the injection of said slurry to displace said waste material away from said well and within said fracture.

10. The method set forth in claim 8 wherein:

said sealant material is added to said fracturing fluid in sufficient quantity to provide a viscosity of said fracturing fluid of at least about 70 centipoise.

\* \* \* \* \*